(12) United States Patent
Karppanen (10) Patent No.: US 9,959,506 B1
(45) Date of Patent: May 1, 2018

(54) PREDICTIVE CONTENT RETRIEVAL USING DEVICE MOVEMENTS

(71) Applicant: Amazon Technologies, Inc., Reno, NV (US)

(72) Inventor: Jari Juhani Karppanen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 456 days.

(21) Appl. No.: 14/306,776

(22) Filed: Jun. 17, 2014

(51) Int. Cl.
*G06N 5/04* (2006.01)

(52) U.S. Cl.
CPC .................. *G06N 5/048* (2013.01)

(58) Field of Classification Search
None
See application file for complete search history.

(56) References Cited

U.S. PATENT DOCUMENTS

| | | | | |
|---|---|---|---|---|
| 8,812,419 | B1* | 8/2014 | Teller | G06Q 10/10 706/46 |
| 9,405,399 | B2* | 8/2016 | Hewitt | G06F 3/0416 |
| 9,406,025 | B2* | 8/2016 | Hewitt | G06F 3/0416 |
| 2008/0005057 | A1* | 1/2008 | Ozzie | G06F 17/30902 |
| 2008/0140840 | A1* | 6/2008 | Hamilton | H04W 4/02 709/226 |
| 2008/0200161 | A1* | 8/2008 | Morse | G06F 17/30867 455/418 |
| 2010/0287178 | A1* | 11/2010 | Lambert | G06Q 30/02 707/765 |
| 2013/0226837 | A1* | 8/2013 | Lymberopoulos | G06F 17/30902 706/12 |
| 2013/0267254 | A1* | 10/2013 | Zhang | H04W 4/02 455/456.3 |
| 2014/0129772 | A1* | 5/2014 | Kalamatianos | G06F 12/0897 711/119 |
| 2015/0120641 | A1* | 4/2015 | Soon-Shiong | G06N 5/04 706/52 |
| 2015/0324867 | A1* | 11/2015 | Jalili | H04L 67/2847 705/14.73 |

(Continued)

OTHER PUBLICATIONS

Parate et al., "Practical Prediction and Prefetch for Faster Access to Applications on Mobile Phones", Sep. 8-12, 2013, UBIComp 2013, pp. 1-10.*

(Continued)

*Primary Examiner* — Paulinho E Smith
(74) *Attorney, Agent, or Firm* — Knobbe, Martens, Olson & Bear, LLP (57) ABSTRACT

Features are disclosed for predicting or otherwise determining when a user will initiate an operation on a user computing device, such as requesting network-accessible content. Upon making the determination, the user computing device can proactively perform the determined operation or portions thereof. The user computing device may use a detection model or profile that associates user-initiated operations with data from sensors on the user computing device. The sensors may include movement sensors, environmental sensors, and the like. One benefit, among others, is that user-perceived performance can be improved because some or all of a user-initiated operation has been performed prior to user-initiation of the operation.

22 Claims, 5 Drawing Sheets

(56) References Cited

U.S. PATENT DOCUMENTS

2016/0072911 A1* 3/2016 Velummylum ....... H04W 4/025
                                                    709/224
2016/0162597 A1* 6/2016 Karppanen ....... G06F 17/30905
                                                    715/240

OTHER PUBLICATIONS

Shin et al., Understanding and prediction of mobile application usage for smart phones. In Proc. of UbiComp'12, ACM (2012), 173-182.*
Yan et al, "Fast app launching for mobile devices using predictive user context.", 2012, In Proc. of MobiSys 2012, 113-126.*

* cited by examiner

PREDICTIVE CONTENT RETRIEVAL USING DEVICE MOVEMENTS

BACKGROUND

When a user requests a web page or other content page via a browser application, the user typically experiences a noticeable delay before the page is displayed. Various factors can contribute to this delay. These factors include, for example, (1) the speed of the wireless or wired connection between the user device and the Internet, (2) the location of, and load on, the origin server that hosts the page, (3) the size of the page, including any embedded graphics, (4) whether, and the extent to which, the page includes embedded objects that need to be separately retrieved (possibly from different domains) once the page's HTML has been loaded, (5) the complexity of the page's coding, including any scripts, and (6) the processing power of the user device. When the delay is significant (e.g., several seconds or more), the task of browsing can be frustrating for users.

Various methods exist for reducing the delay experienced by users. Some methods include the use of caching proxy servers, which store recently-retrieved versions of content and provide the content to users faster than origin servers due to their cache management algorithms, proximity to the user devices, and the like. Other methods of reducing the delay experienced by users include prefetching content based on users' requested schedules or previous content requests. For example, users may request certain content pages to be retrieved and stored locally on their devices at some predetermined time so that the users can later view the content offline. As another example, some browser applications prefetch, in the background, content linked from a requested page. If a user clicks or otherwise activates one of the links, the linked content can then be displayed faster than if the browser had to retrieve the content from a content server after the link activation.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

The present disclosure relates to using sensor data regarding physical movements of a computing device, environmental conditions, and the like to predict or otherwise determine when a user will request content or initiate some other computing task. The computing device can preemptively or proactively retrieve ("prefetch") content or execute some other preparatory operation before the user requests the content or performs the computing task. In this way, user-perceived latency can be reduced or minimized when a user subsequently requests the predicted content or initiates the predicted computing task. In some embodiments, the computing device can prefetch content or execute other preparatory operations before the user even logs into the computing device, "wakes" the device, or otherwise interacts with the user interface of the device.

Conventional methods of pre-fetching content are typically based on user-defined schedules or contemporaneous content requests. For example, users may request certain content pages to be retrieved and stored locally on their devices at some predetermined time so that the users can later view the content offline. As another example, some browser applications prefetch, in the background, content linked from a requested page. If a user clicks or otherwise activates one of the links, the linked content can then be displayed faster than if the browser had to retrieve the content from a content server after the link activation.

Some aspects of the present disclosure relate to the use of sensors to monitor physical movements of a computing device, environmental conditions, and the like. User-initiated operations on the computing device can also be monitored. The computing device or a separate network-accessible detection management system can use sensor information and usage information to identify a set of circumstances under which the user is likely to initiate a certain operation. For example, the computing device may include an accelerometer, gyroscope, camera, microphone, and/or various other sensors. Information obtained from these sensors can be stored for future analysis. A user may use the computing device to request content pages (e.g., web pages) or other network-accessible content items from content servers. The computing device or another system may determine that when the device is moved in a particular way at a particular time of day (e.g., based on information obtained from the gyroscope and accelerometer in the early evening), the user is more likely to request a particular content page (e.g., the main page of a specific news website) than initiate any other operation. Once this determination has been made, a detection profile or some other model can be generated for use by the computing device. The detection profile may include information about data from particular sensors or combinations thereof, and the operation most likely to be initiated by a user when such sensor data is observed (or at some predictable time thereafter). After the detection profile has been generated, the computing device can monitor the sensors for information that approximates or satisfies the detection profile. When such sensor data is observed, the computing device can perform proactive tasks to improve the user experience if the user subsequently initiates the predicted operation (e.g., requests the predicted content page). In this example, the computing device can prefetch the content page when the detection profile is satisfied so that the content page is available locally when the user requests the page.

Additional aspects of the present disclosure relate to tasks that can be proactively performed when sensor data satisfies a detection profile. In some embodiments, sensor data may be processed to produce a score, such as a confidence score, indicating how closely the sensor data matches the detection profile or how likely a user is to perform a particular task. Based on the score, different tasks can be proactively performed. For example, if a score indicates a very high likelihood that a detection profile is satisfied or that a user will request a particular content page, then the content page can be prefetched and rendered in the background at the user device. When the user subsequently requests the content page, the prerendered version can be displayed substantially immediately. As another example, if a score indicates a moderate likelihood that a detection profile is satisfied or that a user will request a particular content page, then the content page can be prefetched at a remote server, such as a proxy or other intermediary system. When the user subsequently requests the content, the prefetched version can be downloaded from the proxy, which may be faster than retrieving the content page from the origin content server.

Although aspects of the embodiments described in the disclosure will focus, for the purpose of illustration, on prefetching and other proactive content retrieval and processing operations, one skilled in the art will appreciate that the techniques disclosed herein may be applied to any number of services, processes, or applications. In some embodiments, user-initiated operations such as launching applications, listening to music, and the like can be predicted. When a detection profile associated with such a user-initiated operation is satisfied, proactive tasks can be performed to reduce latency and otherwise improve the user experience. For example, predicted music can be cached, a predicted application can be launched in the background, etc.

Various aspects of the disclosure will now be described with regard to certain examples and embodiments, which are intended to illustrate but not limit the disclosure.

System Components

Figure 1:
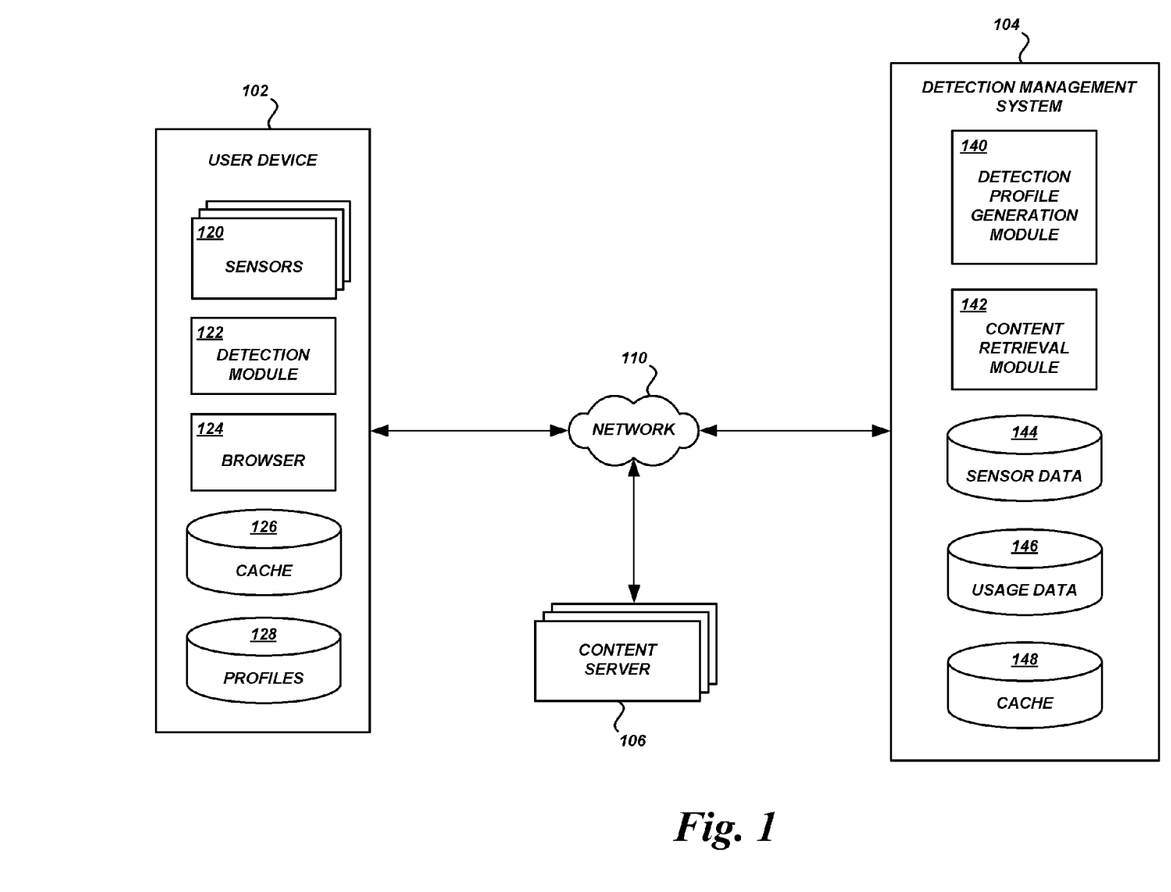
FIG. 1 illustrates a network environment with a detection management system that analyzes user device sensor data to predict which operations a user will perform.

FIG. 1 illustrates an example network environment in which features can be implemented for detecting device movements, environmental conditions, and the like to predict how users will interact with user devices and to perform proactive operations. The network environment shown in FIG. 1 includes a user device 102, a detection management system 104, and various content servers 106, such as origin content servers and content delivery network ("CDN") servers. The devices may communicate with each other via one or more communication networks 110. A network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

As will be appreciated by those of skill in the relevant art, the network environment may include any number of distinct user devices 102 and/or content servers 106. In addition, multiple (e.g., two or more) detection management systems 104 may be used. For example, separate detection management systems 104 may be located so that they are close (in either a geographical or networking sense) to groups of current or potential user devices 102 or content servers 106. In such a configuration, a user device 102 may prefetch content via the detection management system 104 to which it is closest, rather than all user devices 102 prefetching content via a single detection management system 104.

The user devices 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual user devices 102 may include one or more sensors 120, such as accelerometers, gyroscopes, global positioning system ("GPS") components, light sensors, thermometers, heart rate monitors, cameras, touch screens, fingerprint scanners, and the like. In addition, individual user devices 102 may include a detection module 122 to process information from the sensors 120 and determine whether a user will likely perform some task, a browser application 124 to request and display network content, a content cache 126 to store content, including prefetched content, and a profiles data store 128 to store the detection profile(s) used by the detection module 122, as described in greater detail below. In some embodiments, the browser 124 running on the user device 102 may be a conventional web browser that is not specifically designed or configured to prefetch content based on detection of sensor data satisfying a detection profile. For example, the browser 124 may use or otherwise be associated with a module that is not integrated with the browser 124, such as a browser add-in or extension, that provides such functionality to the browser 124. In some embodiments, applications other than a browser 124 may interact with the detection module 122, receive triggered detections, and perform proactive operations. For example, content aggregators or other specialized content display applications for mobile devices (e.g., Flipboard) may prefetch content, applications such as music players may launch and queue up predicted music, etc.

The detection management system 104 can be a computing system configured to process sensor data and usage data received from user devices 102, generate detection profiles for use by the user devices 102, and retrieve content from content servers 106 on behalf of user devices 102. The detection management system 104 can be a physical server or group of physical servers that may be accessed via the network 110. In some embodiments, the detection management system 104 may be an intermediary system, proxy server, system operated by an internet service provider ("ISP"), and/or some other device or group of devices that generate detection profiles and retrieve content on behalf of user devices 102.

The detection management system 104 may include various modules, components, data stores, and the like to provide the detection profile generation and content retrieval functionality described herein. For example, the detection management system 104 may include a detection profile generation module 140 to process sensor data and usage data received from user devices 102 and generate detection profiles. The sensor data and usage data may be stored in data stores in or associated with the detection management system 104, such as a sensor data store 144 and a usage data store 146. At a predetermined or dynamically determined schedule, or in response to some event, the detection profile generation module 140 can analyze the sensor data and usage data to identify patterns in the data, such as correlations of certain content requests with certain sensor data. The detection profile generation module 140 can generate detection profiles or some other model or rule to be used by user device 102 to predict certain user actions and perform proactive operations, as described in greater detail below.

The detection management system 104 may also include a content retrieval module 142 that retrieves content from content servers 106 on behalf of user devices 102 and provides the content to the user devices 102. In some embodiments, the detection management system 104 may operate as a proxy server or other intermediary between user devices 102 and content servers 106. The content retrieval module 142 can obtain content requested by user devices 102, optionally perform some content processing (e.g., parsing, rendering, execution, etc.), and provide responses to the user devices 102 so that the user devices 102 can display the requested content. The content retrieval module 142 can also perform prefetch operations for user devices 102, such as requests triggered by detection of sensor data that satisfies a detection profile. The prefetched content can be stored at the detection management system 104 (e.g., in the cache 148 or in a server-based browser application instance) until a user initiates a request on the user device 102 for the content, or the prefetched content can be proactively provided to a user device 102 without a user-initiated request for the content. In some embodiments, the detection management system 104 may not serve as a proxy or intermediary between user deices 102 and content servers 106, or the detection management system 104 may only serve as a proxy in certain cases, such as when content is to be prefetched and maintained remotely from the user device 102 until a user initiates a request for the content.

The detection management system 104 may be a single computing device, or it may include multiple distinct computing devices, such as computer servers, logically or physically grouped together to collectively operate as an intermediary system. The components of the detection management system 104 can each be implemented as hardware, such as a server computing device, or as a combination of hardware and software. In addition, the modules and components of the detection management system 104 can be combined on one server computing device or separated individually or into groups on several server computing devices. In some embodiments, the detection management system 104 may include additional or fewer components than illustrated in FIG. 1.

In some embodiments, the features and services provided by the detection management system 104 may be implemented as web services consumable via the communication network 110. In further embodiments, the detection management system 104 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The content servers 106 can correspond to logical associations of one or more computing devices for hosting content and servicing requests for the hosted content over the network 110. For example, a content server 106 can include a web server component corresponding to one or more server computing devices for obtaining and processing requests for content (such as content pages) from user devices 102, the detection management system 104, or other devices or service providers. In some embodiments, one or more content servers 106 may be associated one or more CDN service providers (e.g., entities that manage multiple CDN servers), application service providers, etc.

Network Interactions and Data Flows

Figure 2:
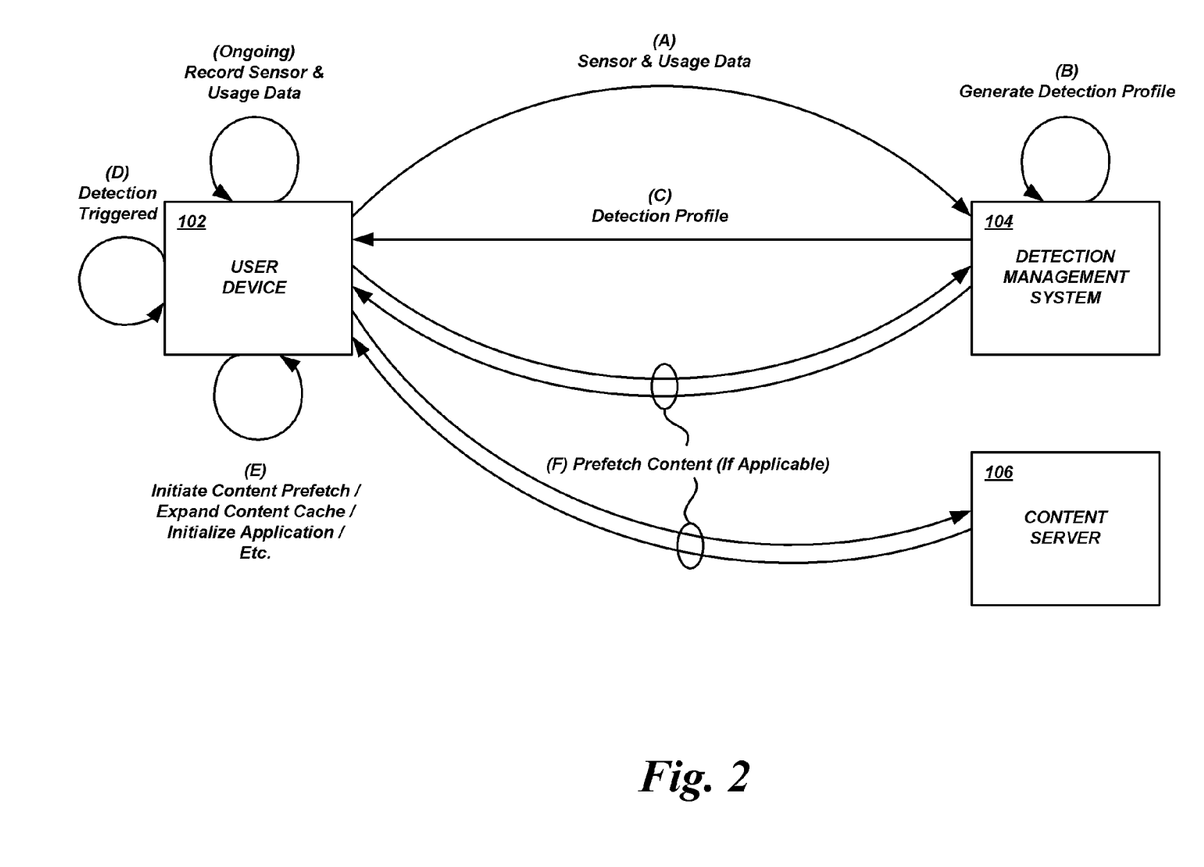
FIG. 2 illustrates example data flows and interactions between a user device, detection management system, and content server according to some embodiments.
Figure 3:
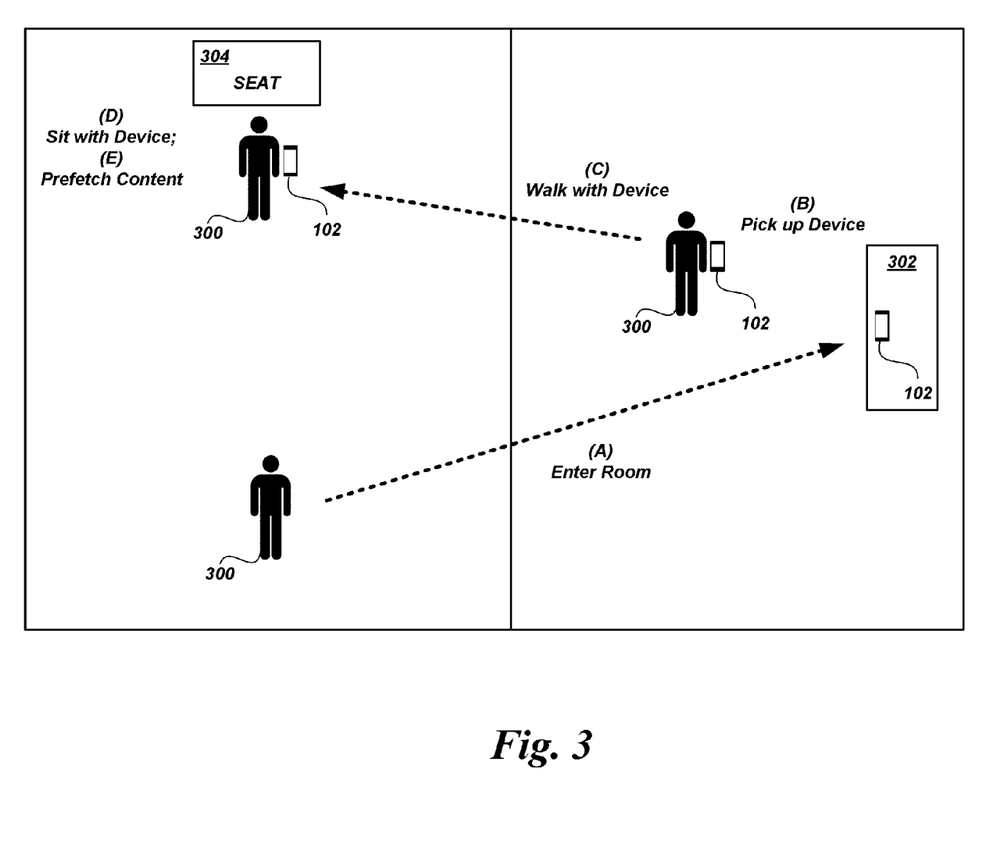
FIG. 3 illustrates example user interactions and device movements that may trigger predictive content retrieval according to some embodiments.

FIGS. 2 and 3 show example interactions between a user 300, a user device 102, a detection management system 104, and a content server 106 during the monitoring of sensor data to detect or predict when the user 300 may initiate some computing operation. The interactions shown in FIGS. 2 and 3 will be discussed with respect to particular physical movements of the user device 102 and a predicted request for a specific content page that follows the physical movements of the user device 102. However, the example sensor data and user-initiated operation are illustrative only, and are not intended to be liming. In some cases, other types of movements be detected, or other sensor data altogether may be received. In addition, other content pages may be requested by the user, or other computing operations altogether may be initiated by the user. For example, a single user device 102 may be configured to detect multiple (e.g., two or more) distinct movements, movement combinations, combinations of movements and environmental characteristics, etc. The user device 102 may also be configured to predict a request for a different content page or initiation of a different operation based on each of the distinct movements/combinations that can be detected (or some subset thereof). Illustratively, a content page requested by the user device 102 may be any content page hosted or offered by a content server 106, such as a web page. The content page may be defined, at least partially, by a base resource such as an HTML file. The base resource does not need to be a pre-existing file, but may instead be a dynamically generated stream of markup language, metadata, or other content. The base resource may reference one or more embedded resources, such as images, videos, script files, executable objects, and the like. For example, if the base resource is an HTML file, it may include tags referencing various external objects and including network addresses of servers from where the external objects may be obtained.

As shown in FIG. 2, a user device 102 may record sensor and usage data in an ongoing process. In some embodiments, when the user device 102 is powered on, sensors 120 such as accelerometers, gyroscopes, global positioning system ("GPS") components, light sensors, thermometers, heart rate monitors, cameras, touch screens, fingerprint scanners, and the like may record data regarding sensed events or provide data to other components for processing, recording, transmission, etc. For example, a mobile user device 102, such as a tablet computer or a smart phone may be picked up and carried by a user 300 around a home, or outside of the home. The accelerometer or GPS component may generate data regarding the physical movements of the user device 102. The data can be recorded and stored on the user device 102 and/or transmitted to a remote detection management system 104 at (A). Data regarding physical movements of the user device 102 may be stored in the form of vectors or parametric curves, such as movement vectors, Bezier curves and the like. For example, the user device 102 can generate and store a compact representation of device movement over a period of time as a sequence of movement vectors. Individual movement vectors can indicate velocity, direction and distance.

In addition to the sensor data, usage data regarding operational use of the user device 102 may be recorded, such as data indicating which content has been requested, which applications have been launched, and/or which other user-initiated operations have been performed on the device 102. This usage data may also be recorded and stored on the user device 102 and/or transmitted to the remote detection management system 104 at (A). In some embodiments, the sensor data and/or usage data may be recorded with time-stamps that are later used to detect correlations in time between, e.g., particular device movement patterns and particular content requests. For example, device movements that occur shortly before a content request is made may be correlated with requests for the content. Device movements that occur after the content request is made may be excluded from the analysis because they occur too late to be useful in predicting user-initiated operations and preemptively performing tasks associated with the user-initiated operations.

The remote detection management system 104 can analyze the sensor and usage data at (B) to generate or update a detection model or a detection profile. The terms "detection model" and "detection profile" may be used interchangeably; for simplicity, only the term "detection profile" is used herein. A user device 102 can use a detection profile to determine, based on data from one or more sensors 120 (e.g., movement vectors generated from accelerometer output for a current or past period of time), which specific user-initiated operation is most likely to occur (e.g., a user-initiated request for a specific content page at a specific network address), if any. A single most-likely user-initiated operation may be determined, where "most likely" corresponds to the highest statistical probability or likelihood, regardless of the absolute probability or likelihood of occurrence, or the strength of the correlation between the sensed events and the user-initiated operation. In some embodiments, the most likely user-initiated operation may correspond to only those user interactions with a likelihood of occurrence that exceeds some threshold, such as a 50%, 67% 75%, 90%, 95% or 99% likelihood of occurrence. In some embodiments, the top n user-initiated operations may be determined, wherein n is some predetermined or dynamically determined number or percentage of possible user-initiated operations. The detection profile can be used by the user device 102 as described in further detail below.

In some embodiments, the detection profile generation module 142 or some other module or component of the detection management system 104 can utilize statistical modeling, machine learning, or other techniques to determine which user-initiated operations are likely to follow or occur concurrently with particular sensed events. For example, sensor data and corresponding usage data (e.g., usage data from the same time period as the sensor data or from a time period following the time period of the sensor data) can be used to train a machine learning model, such as a classifier. The classifier can be trained on the sensor data and known corresponding usage data to label or otherwise determine which user-initiated operation is predicted to occur when given an unknown set of sensor data. As another example, statistical methods may be used to generate a regression model. The regression model can be calculated from—or trained on—sensor data and known corresponding usage data to generate likelihoods or probabilities that particular user-initiated operations will occur when given an unknown set of sensor data. Additional or alternative techniques may be used to generate the detection profiles.

The detection management system 104 can provide a detection profile (or multiple detection profiles) to the user device 102 at (C). The detection profile may be based on only sensor data and usage data from the specific user device 102 or associated with a specific user of the user device 102 (e.g., as determined using logins, fingerprint scans, etc.), and may therefore be highly customized. In some embodiments, the detection profile(s) may be generated using data from multiple (e.g., two or more) different user devices 102, such as data from every user device 102 that provides sensor and usage data to the detection management system 104, or data from user devices 102 that are "clustered" or otherwise exhibit similar characteristics (e.g., similar sensor data and/ or usage data). In some embodiments, the detection profile may be generated by the user device 102 rather than a remote detection management system 104. For example, the detection profile generation module 142 may be integrated into or associated with the detection module 122, browser application 124, or some other module or component of the user device 102, or it may be a stand-alone application or service of the user device 102.

The detection module 122 or some other module or component of the user device 102 can use the detection profile(s) to process sensor data that is continually or intermittently monitored on the user device 102. If the detection module 122 determines at (D) that the current or previous data from the sensor(s) 120 of the user device indicates that a particular user-initiated operation is likely to occur (or more likely than any other user-initiated operation), the user device 102 can automatically (e.g., without user initiation) begin to perform proactive operations. As shown in FIG. 2, the user device 102 can preemptively initiate a content prefetch operation at (E) if the likely user-initiated operation is a request of a particular content page. The content page may be prefetched at (F) through the detection management system 104. In some embodiments or for some content, the predicted content can be prefetched directly from the content server 106 that hosts the content (or some other content source associated with the origin content server, such as a CDN service provider) instead of using the detection management system 104 as an intermediary.

In some embodiments, the user device 102 may preemptively initiate additional or alternative actions at (E), depending upon the detection profile used by the detection module 122, the detection that was triggered at (D), etc. For example, the user device 102 may maintain several portions of the content cache 126 in compressed form. The user device 102 may expand one or more portions of the cache 126 that include content that the user is predicted to request next. In this way, the cache hit rate may be optimized or otherwise maintained at a satisfactory level while the total size of the cache 126 may be minimized, reduced, or otherwise maintained at a satisfactory level. As another example, the user device 102 may initialize an application that the user is expected to open or run. The user may be predicted to listen to a particular playlist from a streaming music service or view a particular video from a streaming video service, and the user device 102 can launch the appropriate application in the background and begin streaming the predicted content. The preemptive actions shown in FIG. 2 and described herein are illustrative only, and are not intended to be limiting. In some embodiments, additional or alternative preemptive actions may be performed in response to detections triggered by the detection module 122, or multiple (e.g., two or more) detection profiles may be used to trigger multiple detections and preemptively initiate multiple actions simultaneously, asynchronously, serially, etc.

FIG. 3 illustrates an example application of a detection profile that uses data from one or more sensors 120 to trigger a positive detection, and the subsequent prefetching of content that follows the triggered detection. As shown in FIG. 3, a user 300 may approach a user device 102 at (A). The device 102 may be on a table 302 or in some other substantially stationary location such that the sensors 120 (e.g., accelerometer, gyroscope) have not produced sensor data reflecting movement of the device 102 for some period of time. The user 300 may pick up the device 102 at (B). Sensor data generated by the sensors 120 of the user device 102 may be processed using one or more detection profiles. Illustratively, the detection profiles may indicate that this type of movement does not indicate that a particular user-initiated operation is likely. For example, the device 102 may be picked up many times throughout the day (e.g., to be used, to be moved, to be charged, to clean the table on which it is sitting, to be put way, etc.), and that "pick up" event alone is not strongly correlated with a specific user-initiated operation on the device 102 (e.g., a request for a specific content page or group of pages).

The user 300 may walk with the device at (C). Sensor data generated by the sensors 120 of the user device 102 may be processed using one or more detection profiles. For example, accelerometer data may indicate that multiple steps are being taken with the device 102, similar to the detection of steps performed by a pedometer. As another example, GPS data may be used to detect physical movement of the device 102 to a different location. The detection profiles may indicate that this type of movement does not indicate that a particular user-initiated operation is likely. Rather, the device 102 may be moved many times throughout the day, and that event alone is not strongly correlated with a specific user-initiated operation on the device 102.

The user 300 may sit down with the device at (D). Sensor data generated by the sensors 120 of the user device 102 may be processed using one or more detection profiles. For example, accelerometer data may indicate that the device 102 has moved vertically downward, but has not experienced a sudden impact as might occur if the device 102 had been dropped. In this example, the detection module 122 may use one or more detection profiles to determine that this type of movement indicates the user is likely to request a particular content page, such as the main page of a news website. The detection may be based on the sensor data regarding the combination of pickup/walk/sit down events. The detection may also or alternatively be based on environmental or contextual data, such as the time of day, microphone input (e.g., the user says to a family member "I'm going to read the news"), light sensor input (e.g., the user has turned on the reading light next to the seat 304), GPS data indicating the geographic position of the user device 102 (e.g., the location of the user device 102 within the house), or any other sensor input or contextual information available to the detection module 122. In response to the triggered detection, the browser 124 or some other module or component of the user device 102 can automatically prefetch the main page of the news website at (E) and store it in the local content cache 126 so that it is available on the device if/when the user 300 does proceed to request it. In some embodiments, the browser 124 may automatically perform some other operation instead of or in addition to prefetching the content page into the cache 126. For example, the browser 124 may render the content page so that it can be immediately displayed when the user 300 requests the page.

The example device movements and user interactions shown in FIG. 3 and described above are illustrative only, and are not intended to be limiting. In some embodiments, other device movements, user-initiated operations, and the like may be used and/or detected. For example, if device movements and environmental information indicate that the user device 102 is likely to lose its network connection, then content may be prefetched onto the user device 102 so that it is available when the device 102 has no network connection or an unsatisfactory network connection.

As another example, sensors 120 (e.g., accelerometers) that produce data sufficient to determine the orientation of the device or a change in device orientation can be used to determine that a user has oriented the device in landscape mode prior to waking the device 102 for use, prior to launching the browser application 124, etc. This particular orientation may indicate that the user is going to launch the browser 124 or otherwise request content.

As yet another example, the movements of one device (and, in some embodiments, data from other sensors) may be used to trigger preemptive initiation of actions on another device separate from the first device, such as movements of a remote control triggering preemptive retrieval of content on a smart TV or set-top box, movements of a mobile phone triggering preemptive retrieval of content on a personal computer, etc. Illustratively, a user may consume content on a mobile phone, and then sit down or place the mobile phone down next to the user's personal computer. Sensor data can detect this scenario (e.g., through the use of GPS data, near-field communications, Wi-Fi-based location detection, etc.), and content can be preemptively retrieved on the personal computer in anticipation of a user-initiated request for the content.

As a further example, device movements (and, in some embodiments, data from other sensors) may be used to predict user-initiated operations far in advance (e.g. several minutes or hours). In such cases, certain preparatory operations (e.g., content prefetching) may occur in a delayed manner, such as minutes or hours after the detection of a particular device movement, pattern of movements, environmental factors, etc. Then, additional preparatory operations (content prerendering) can be performed when a subsequent triggering event occurs, such as the device 102 being picked up at about the time the user-initiated operation was predicted to occur, the light above or near the device 102 being turned on, etc. In this way, preparatory or otherwise preemptive actions can be performed even in cases where there is little or no time between a state of no device movement or otherwise neutral sensor input and a subsequent user-initiated action (e.g., a user picks up a device and immediately requests content after coming home, without first walking or sitting as shown in FIG. 3).

As a still further example, movements of a device (and, in some embodiments, data from other sensors) may be used to trigger adjustments in the quality of service or other delivery parameters and/or characteristics of content delivery. Illustratively, if a user has taken a mobile phone onto a commuter train during a busy time of day, the audio quality provided by a streaming music service may be reduced in order to conserve bandwidth because the user will less likely or unable to perceive the difference in quality.

As another example, movements of a device (and, in some embodiments, data from other sensors) may be used to trigger resizing of user interface elements. Illustratively, user interface elements (e.g., text, buttons, etc.) can be enlarged when device movement indicates the user may have difficulty focusing on small text, such as during walking, jogging, a bumpy bus trip, etc. In this way, the movement detection and user interface resizing may enhance the user's ability to read text or interact with the device 102 while moving. In some embodiments, the user interface elements may be shrunk when there is little or no movement detected, such as when the user is seated in a stationary location, such as on a sofa at home.

As yet another example, movements of a device (and, in some embodiments, data from other sensors) may be used to trigger user prompts. Illustratively, an application can prompt the user to choose whether a particular content item should be modified (e.g., shortened, summarized, filtered to remove advertisements or other distractions, etc.) when the movement pattern of the device indicates the user may have difficulty consuming content.

As a further example, movements of a device (and, in some embodiments, data from other sensors) may be used to trigger disabling/enabling the device or certain aspects of the device. Illustratively, the device 102 may disable/enable user interface elements when detecting movement matching a certain profile or pattern (e.g., to prevent accidentally triggering functions, such as when a child is handling the device), change various configuration settings or user preferences when detecting movement matching a certain profile or pattern (e.g., a pattern indicative of a particular user handling the device), lock down or implement theft-prevention measures when detecting movement that does not match any known profiles (e.g., device movement pattern indicates an unknown user is handling the device), etc.

Sensor Data Processing and Proactive Operations

Figure 4:
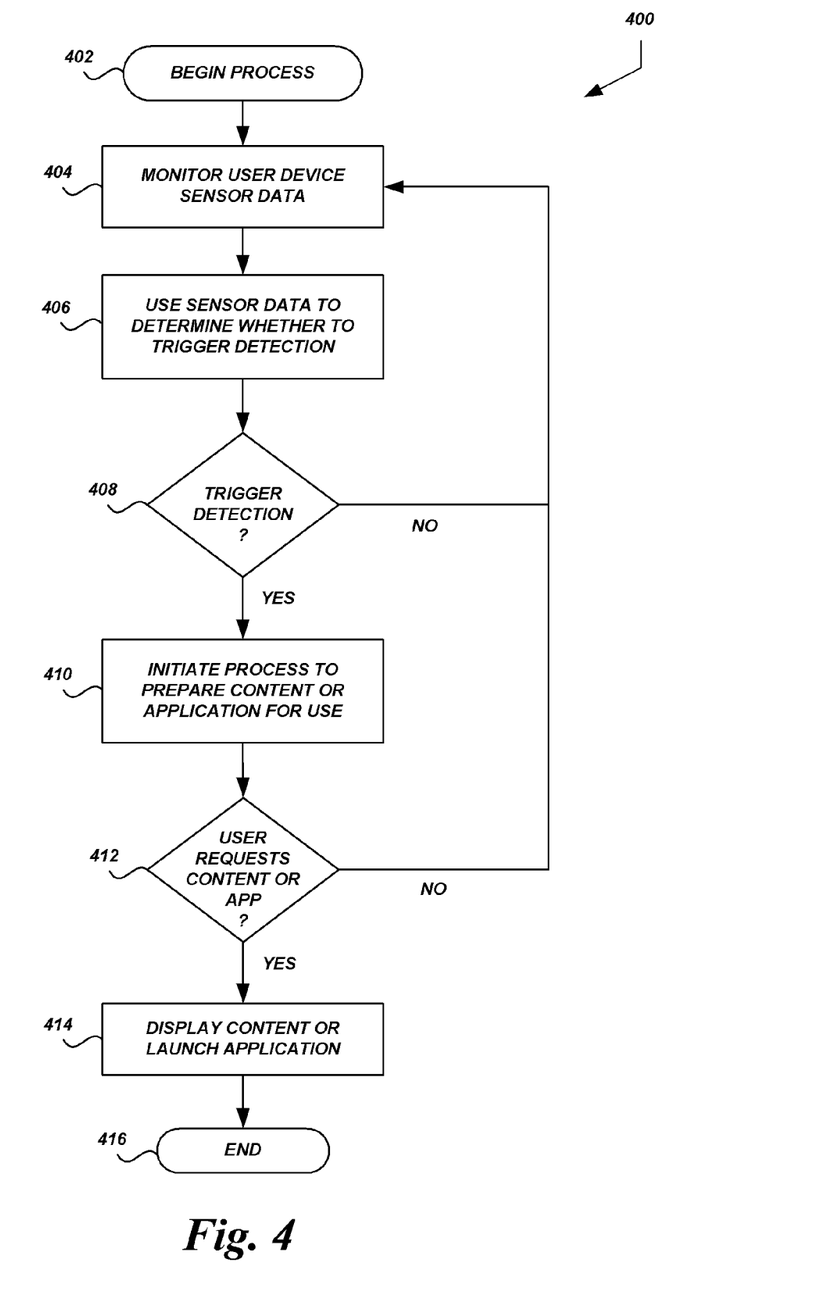
FIG. 4 is a flow diagram of an illustrative process for triggering predictive content retrieval according to some embodiments.
Figure 5:
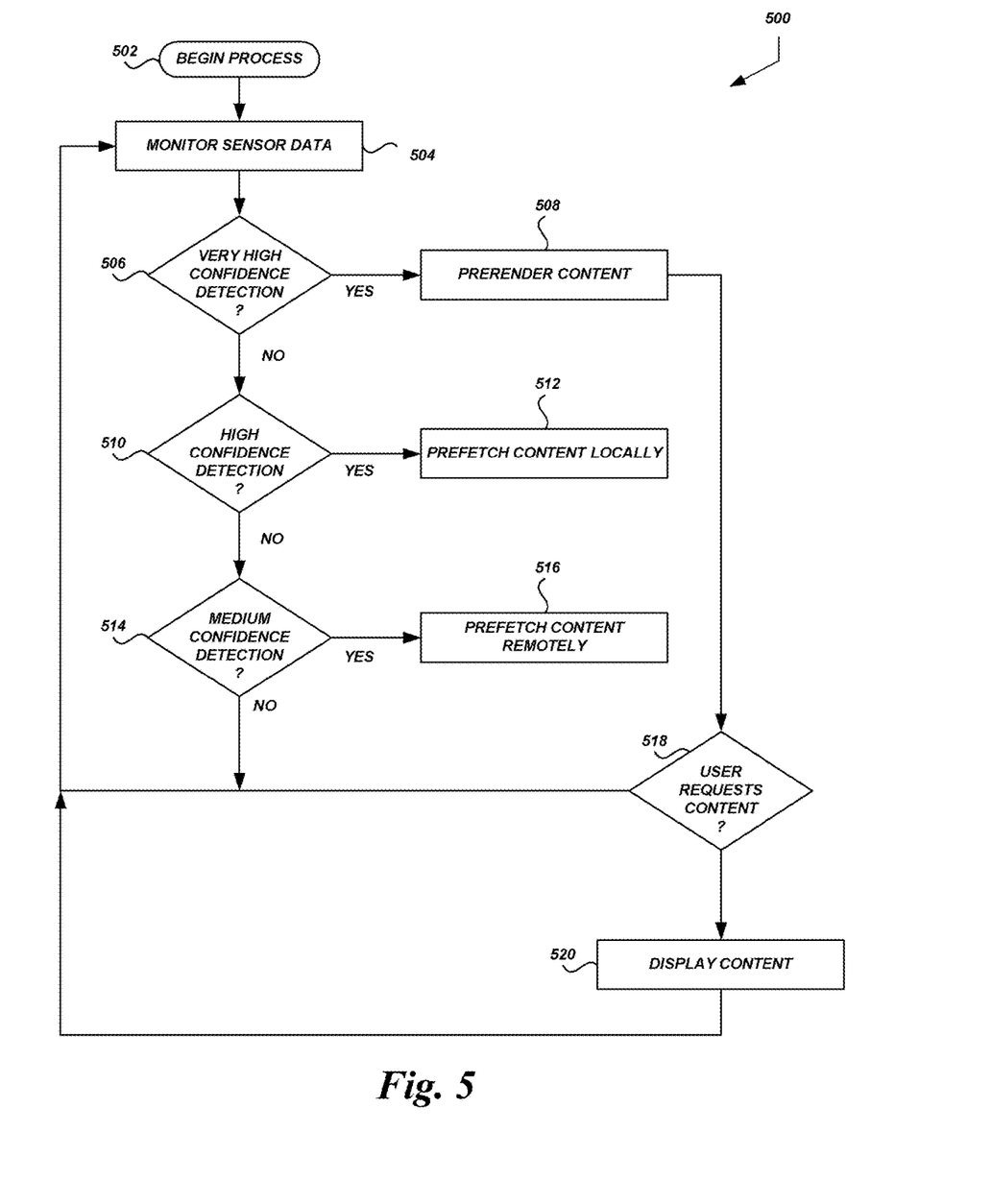
FIG. 5 is a flow diagram of another illustrative process for triggering predictive content retrieval according to some embodiments.

FIGS. 4 and 5 are flow diagrams of processes 400 and 500 for using sensor data from sensors 120 of a user device 102 to trigger detections of events indicative of various user-initiated operations, or for predicting the occurrence of various user-initiated operations based on data from sensors of the user device 102.

The process 400 begins at block 402. At block 404, the detection module 122 or some other module or component of the user device 102 can monitor sensors 120 of the user device 102. For example, the detection module 122 may monitor data received form sensors 120 continually while the user device 102 is powered on, or according to some predetermined or dynamically determined schedule.

At block 406, the detection module 122 or some other module or component of the user device 102 can use the sensor data to determine whether to trigger a detection event. The detection module 122 may use a detection model or detection profile to determine whether the current sensor data indicates that a particular user-initiated operation is likely to occur.

At decision block 408, if the detection module 122 determines that a user-initiated operation is likely to occur based on the sensor data and detection profile, the process 400 can proceed to block 410. Otherwise, the process 400 can return to block 404.

At block 410, the user device 102 can initiate a process in anticipation of the user-initiated operation determined above. In some embodiments, the detection module 122 may provide an application programming interface ("API") or service on the user device 102. The detection module 122 can use the API or service to provide notifications of predicted user-initiated operations to applications or other services that subscribe to or are otherwise configured to receive such notifications. For example, if the predicted user-initiated operation is activation of an application on the user device 102, then the application may be notified (and may proceed to execute a preliminary startup routine), or a separate application or service such as an application manager may be notified (and may proceed to execute the preliminary startup routine). If the predicted user-initiated operation is the use of an application to perform some specific task, such as listening to a certain song or radio station, then the notification may indicate the specific operation, and the application may perform preliminary operations relevant to the predicted user-initiated operation. As another example, if the predicted user-initiated operation is the retrieval of network-accessible content, then the browser 124 or some other application or service can be notified and may initiate a content prefetch operation. As a further example, a recommendation service may receive notifications from the API, and certain recommendations (e.g., advertisements on a web page) can be prepared or retrieved based on the particular detection triggered by the API.

At decision block 412, the user device 102 can determine whether the predicted user-initiated operation has indeed been initiated by the user. If so, the process 400 can proceed to block 414, where the operation is completed (e.g., any remaining tasks are preformed, such as displaying prefetched content, initiating playback of preloaded songs, etc.).

FIG. 5 illustrates a process 500 for executing various content prefetch operations in response to the detection or prediction of a content request. The process 500 includes a multi-tiered approach, whereby different preparatory operations are performed depending upon the confidence with which a user-initiated operation can be predicted and a cost associated with the different preparatory operations. Preparatory operations incur the greatest cost from a computing resource utilization standpoint (but which also confer the greatest performance benefit) may be performed when the detection or prediction confidence is high. Preparatory operations that incur a lower cost may be performed more often, such as when detection or prediction confidence is comparatively lower. The process 500 begins at block 502, and sensor data may be monitored at block 504 as described above.

At decision block 506, the detection module 122 can determine whether a prediction of a specific content request (or detection of events that indicate the content request is likely) can be made with a particular degree of confidence. For example, the detection module 122 may compute a score, such as a detection score or confidence score, based on the sensor data and the detection profile. If the score exceeds some threshold and a particular user-initiated operation can be predicted with a certain degree of confidence (e.g., the score exceeds a "very high confidence" threshold), then the process may proceed to block 508 where the content can be prefetched and rendered locally. In some embodiments, the content may be rendered in a background tab, and if a user proceeds to request the content at decision block 518 as predicted, then the prerendered tab can be activated or swapped into view. In this way, the user can be provided with a substantially immediate response to the content request.

At decision block 510, if the score does not meet the level described above with respect to decision block 506, then the detection module 122 can determine whether the detection of the particular content request can be made with a lower degree of confidence. For example, the score may meet or exceed some secondary threshold (e.g., the "high confidence" threshold, rather than the "very high confidence" threshold), and the process 500 can proceed to block 512 where the predicted content is prefetched locally. In this example, such a secondary prediction may not result in prerendering the content, but instead retrieving the content and, e.g., storing it in the local cache 126. In this way, the content may be locally available to eliminate the need to retrieve the content from the content server 106 if the user requests the content. However, due to the lower degree of confidence associated with the lower score, the content may not be rendered, thereby conserving local computing resources (e.g., processor capacity, memory, power) for lower-confidence or less-likely predictions.

At decision block 514, if the score does not meet the levels described above with respect to decision blocks 506 and 510, then the detection module 122 can determine whether the detection of the particular content request can be made with a lower degree of confidence. For example, the score may meet or exceed some tertiary threshold (e.g., the "moderate confidence" threshold), and the process 500 can proceed to block 516 where the predicted content is prefetched remotely. In this example, such a tertiary prediction may not result in prerendering or prefetching the content locally, but instead causing the content to be retrieved by an intermediary, such as the detection management system 104 or some proxy server. In this way, the content may be available for retrieval from the intermediary server if the user subsequently requests the content, and the retrieval form the intermediary may be faster than the retrieval from the origin content server 106. In addition, such prefetching by the intermediary rather than the user device 102 itself requires little or no computing resource usage by the user device 102 if the predicted content request does not occur.

Although the approach illustrated in FIG. 5 includes a three-tiered confidence score determination, the number of tiers and the associated preparatory operations are illustrative only, and are not intended to be limiting. In some embodiments, additional or fewer tiers may be used. In some embodiments, additional or alternative operations may be used. For example, content may be rendered partially or completely at the intermediary system rather than being prefetched by the intermediary system, or rather than being prefetched or prerendered locally by the user computing device 102. As another example, resources referenced by the base resource of the predicted content item, such as a large image file referenced by an HTML file, can be prefetched or prerendered, rather than the entire content page. In this way, portions of the content page that may present a "bottleneck" can be available locally, thereby improving user-perceived performance without obtaining the entire content page. As a further example, linked content may be prefetched or prerendered in addition to predicted content, such as the top link on a predicted content page.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

For example, the processes 400 and 500 described with respect to FIGS. 4 and 5 may be embodied in a set of executable program instructions stored on one or more non-transitory computer-readable media, such as one or more disk drives or solid-state memory devices, of the user device 102 or a computing system with which the detection management system 104 is associated. When a process 400 or 500 is initiated, the executable program instructions can be loaded into memory, such as RAM, and executed by one or more processors of the user device or computing system. In some embodiments, the computing system may include multiple computing devices, such as servers, and the processes or portions thereof may be executed by multiple servers, serially or in parallel.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a computing device comprising a computer readable memory and one or more hardware processors, wherein the computing device is programmed by executable instructions in the computer readable memory to at least:
      transmit, to a server system that acts as an intermediary between user computing devices and content servers, sensor data indicative of one or more movements of the computing device and request data indicative of one or more content page requests initiated on the computing device;
      receive, from the server system, a detection model that associates content page requests with computing device movements, the detection model based at least partly on the sensor data and the request data;
      obtain further sensor data from one or more sensors of the computing device, the further sensor data indicative of one or more subsequent movements of the computing device;
      determine, using the further sensor data and the detection model, a confidence score regarding a prediction that a user will use the computing device to request a content page during a period of time subsequent to the one or more subsequent movements;
      compare the confidence score to one or more thresholds of a multi-tier confidence threshold hierarchy;
      preemptively initiate, based at least partly on comparing the confidence score to the one or more thresholds, an operation associated with retrieval of the content page from a content server via the server system; and
      subsequent to initiating the operation:
         receive input indicating the user has requested the content page during the period of time; and
         display the content page on a display of the computing device.

2. The system of claim 1, wherein the detection model further associates the request for the content page with data from one or more environmental sensors of the computing device.

3. The system of claim 1, wherein the detection model is further based at least partly on sensor data and request data provided to the server system by a plurality of separate computing devices.

4. The system of claim 1, wherein the computing device is further programmed to at least:
   transmit the further sensor data and further request data indicative of the request for the content page to the server system; and
   receive a new version of the detection model from the server system.

5. A computer-implemented method comprising:
   as implemented by one or more processors configured to execute specific instructions,
      receiving sensor data reflective of device movements of a user computing device;
      receiving content requests generated by the user computing device for network-accessible content items;
      determining, based at least partly on a detection model and further sensor data, a score indicative of how likely a request for a particular network-accessible content item is to occur, wherein the detection model associates a particular device movement pattern with the particular network-accessible content item;
      analyzing the score with respect to one or more thresholds of a multi-tier threshold hierarchy; and
      determining, based at least partly on results of analyzing the score with respect to the one or more thresholds, to proactively perform a content item request operation.

6. The computer-implemented method of claim 5, further comprising associating the particular device movement pattern with the particular network-accessible content item based at least partly on data regarding the device movements and the content requests.

7. The computer-implemented method of claim 5, further comprising initiating the content item request operation, wherein the content item request operation comprises prefetching the particular network-accessible content item.

8. The computer-implemented method of claim 5, further comprising associating the particular device movement pattern with the particular network-accessible content item based at least partly on accelerometer data generated by an accelerometer of the user computing device.

9. The computer-implemented method of claim 5, further comprising prefetching the particular network-accessible content item in response to detecting that the particular device movement pattern has occurred during a particular time of day.

10. The computer-implemented method of claim 5, further comprising associating the particular device movement pattern with the particular network-accessible content item based at least partly on environmental information.

11. The computer-implemented method of claim 10, further comprising obtaining the environmental information at least in part from at least one of: a light sensor, a microphone, a camera, or a thermometer.

12. The computer-implemented method of claim 5, wherein the analyzing the score with respect to the one or more thresholds of the multi-tier threshold hierarchy comprises:
   determining that the score satisfies a first threshold associated with prefetching the particular network-accessible content item to a server remote from the user computing device; and
   determining that the score fails to satisfy a second threshold associated with prefetching the particular network-accessible content item to the user computing device;
   wherein the determining to proactively perform the content request operation comprises determining to proactively prefetch the particular network-accessible content item to the server based at least partly on the score satisfying the first threshold.

13. The computer-implemented method of claim 5, wherein the analyzing the score with respect to the one or more thresholds of the multi-tier threshold hierarchy comprises determining that the score satisfies a threshold associated with pre-rendering the particular network-accessible content item, and wherein the determining to proactively perform the content request operation comprises determining to pre-render the particular network-accessible content item based at least partly on the score satisfying the threshold.

14. Non-transitory computer storage having stored thereon:
   a detection component configured to cause one or more processors to execute a process comprising:
      using a detection profile to determine a score indicative of how likely a user-initiated operation will follow one or more physical movements of a user computing device, wherein the detection profile associates user-initiated operations on the user computing device with data from one or more sensors of the user computing device;
      analyzing the score with respect to one or more thresholds of a multi-tier threshold hierarchy; and
      determining, based at least partly on results of analyzing the score with respect to the one or more thresholds, an operation to perform, wherein the operation to perform is one of a plurality of preemptive operations associated with the user-initiated operation; and
   a detection profile generator configured to cause one or more processors to execute a process comprising using aggregated data from the one or more sensors and aggregated usage data regarding user-initiated operations on the user computing device to generate the detection profile.

15. The non-transitory computer storage of claim 14, wherein the data from one or more sensors comprises data from at least one of: an accelerometer or a gyroscope.

16. The non-transitory computer storage of claim 14, wherein generating the detection profile comprises generating one of a classifier or a regression model.

17. The non-transitory computer storage of claim 14, wherein the detection component is configured to transmit, to a server system, data from the one or more sensors and data reflecting user-initiated operations on the user computing device.

18. The non-transitory computer storage of claim 14, wherein the detection profile generator is configured to generate the detection profile based at least partly on data from sensors of a plurality of user computing devices.

19. The non-transitory computer storage of claim 14, wherein the process further comprises using the detection profile to predict the user-initiated operation based at least partly on environmental information from one or more environmental sensors of the user computing device.

20. The non-transitory computer storage of claim 19, wherein the one or more environmental sensors comprise at least one of: a light sensor, a microphone, a camera, or a thermometer.

21. The non-transitory computer storage of claim 14, the process executed by the detection component further comprising preemptively executing the operation in response to determining the operation to perform.

22. The non-transitory computer storage of claim 21, wherein preemptively executing the operation comprises at least one of: prefetching a content page predicted to be requested by a user; uncompressing at least a portion of a content cache comprising content associated with a content page predicted to be requested by the user; causing a separate computing device to prefetch a content page predicted to be requested by the user; launching an application predicted to be launched by the user; or modifying a quality of service parameter associated with content predicted to be requested by the user.

* * * * *